(12) United States Patent
Stumbo et al.

(10) Patent No.: US 12,454,371 B2
(45) Date of Patent: Oct. 28, 2025

(54) 2-STAGE COLD GAS THRUSTER

(71) Applicant: Woodward, Inc., Fort Collins, CO (US)

(72) Inventors: Steven Charles Stumbo, Severance, CO (US); Brian E. Hoemke, Rockford, IL (US); Joe Sega, Timnath, CO (US); Brian K. Daniels, Machesney Park, IL (US); Ian S. Clark, Belvidere, IL (US)

(73) Assignee: Woodward, Inc., Fort Collins, CO (US)

( * ) Notice: Subject to any disclaimer, the term of this patent is extended or adjusted under 35 U.S.C. 154(b) by 134 days.

(21) Appl. No.: 18/240,261

(22) Filed: Aug. 30, 2023

(65) Prior Publication Data
US 2024/0067365 A1    Feb. 29, 2024

Related U.S. Application Data

(60) Provisional application No. 63/402,769, filed on Aug. 31, 2022.

(51) Int. Cl.
*B64G 1/26* (2006.01)
*B64G 1/24* (2006.01)
*F16K 31/06* (2006.01)

(52) U.S. Cl.
CPC .............. *B64G 1/26* (2013.01); *B64G 1/24* (2013.01); *F16K 31/0637* (2013.01)

(58) Field of Classification Search
CPC ........... F03H 99/00; B64G 1/24; B64G 1/242; B64G 1/26; B64G 1/262; B64G 1/415
See application file for complete search history.

(56) References Cited

U.S. PATENT DOCUMENTS

| | | | | |
|---|---|---|---|---|
| 3,105,671 A | * | 10/1963 | Blatter | B64G 1/401 251/282 |
| 3,132,767 A | * | 5/1964 | Gardner | G01F 11/32 222/3 |
| 3,330,114 A | * | 7/1967 | McQueen | B64G 1/26 222/3 |
| 3,721,402 A | * | 3/1973 | Holland | F02K 9/805 60/229 |
| 4,826,104 A | | 5/1989 | Bennett et al. | |
| 6,068,010 A | * | 5/2000 | Reinicke | F16K 31/0655 251/129.21 |

(Continued)

*Primary Examiner* — Gerald L Sung
(74) *Attorney, Agent, or Firm* — Reinhart Boerner Van Deuren P.C.

(57) ABSTRACT

A cold gas thruster having a two-stage solenoid is provided. Pressurized gas from the inlet flows to the back side of the piston to hold the piston closed. The pressure is maintained by a check ball held by the solenoid armature. When the solenoid is energized, the armature allows the check ball to move to bleed off the pressure holding the piston closed. The piston moves away from its seat and allows the pressurized gas to flow to the outlet creating thrust. When the solenoid coil is de-energized, the check ball is forced against its seat, which blocks the escape of pressure on the back side of the piston, so that it can re-pressurize back up to the inlet pressure. This creates a force imbalance and moves the piston to close the valve and stop the thrust. Different nozzles can be used for different thrust profiles without changing the solenoid.

20 Claims, 2 Drawing Sheets

(56) References Cited

U.S. PATENT DOCUMENTS

| | | | |
|---|---|---|---|
| 6,227,247 B1 * | 5/2001 | Abel | F42B 10/668 |
| | | | 137/550 |
| 6,233,919 B1 * | 5/2001 | Abel | F02K 9/80 |
| | | | 60/233 |
| 6,598,385 B1 * | 7/2003 | Abel | F16K 31/42 |
| | | | 60/228 |
| 6,951,317 B2 | 10/2005 | Woessner et al. | |
| 6,986,497 B1 * | 1/2006 | Starken | F16K 11/044 |
| | | | 251/30.02 |

* cited by examiner

2-STAGE COLD GAS THRUSTER

CROSS-REFERENCE TO RELATED PATENT APPLICATIONS

This patent application claims the benefit of U.S. Provisional Patent Application No. 63/402,769, filed Aug. 31, 2022, the entire teachings and disclosure of which are incorporated herein by reference thereto.

FIELD OF THE INVENTION

This invention generally relates to cold gas thrusters, and more particularly to solenoid actuation mechanisms for cold gas thrusters.

BACKGROUND OF THE INVENTION

Cold gas, monopropellant and bipropellant thrusters are utilized in space applications for controlling orientation, position, and direction of multiple mechanical devices like satellites, missiles, & other space vehicles. The solenoid valves used on these thrusters are typically electro-mechanical devices that turn on and off the fluid media used to create propulsion. Cold Gas Thrusters specifically turn on and off high-pressure gases that are expanded through a supersonic nozzle without combustion. The typical fluid used in Cold Gas Thrusters is high pressure gaseous nitrogen.

Because such thrusters are often used for fine position control adjustments necessary to maintain stable positioning, the timing of the application and termination of such thrusts must occur within tight tolerances. Unfortunately, the solenoids used in such thrusters have an inherent lag, that may differ in time, in the actuation and termination of the valve. Such lags are the result of magnetic flux generation and decay times, mechanical inertia of the armature, spring loading differences, pressure differentials acting on the valving member, etc. Indeed, the greater the pressure of the propellant that the solenoid valve must control, the larger the solenoid must be, which tends to increase these delay parameters.

What is needed, therefore, is a cold gas thruster having a solenoid actuation mechanism that minimizes the actuation and termination times, that reduces the time difference between such actuation lag and termination lag times, and allows for actuation of various different thrust ratings, and that reduces overall size and weight of the actuation control. Embodiments of the present invention provides such a cold gas thruster and a solenoid actuation mechanism therefor. These and other advantages of the invention, as well as additional inventive features, will be apparent from the description of the invention provided herein.

BRIEF SUMMARY OF THE INVENTION

In view of the foregoing, embodiments of the present invention provide new and improved cold gas thrusters having a solenoid actuation mechanism that overcomes at least one of the problems existing in the art. More particularly, embodiments of the present invention provide new and improved cold gas thrusters having a solenoid actuation mechanism that at least reduces the actuation and termination times, reduces the time difference between such actuation lag and termination lag times, allows for actuation of various different thrust ratings, and/or reduces overall size and/or weight of the actuation control.

In one embodiment, a two-stage solenoid actuator mechanism incorporates one or more unique features including low power required for actuation, reduced required solenoid force output compared to a single stage actuator, due in one embodiment to a small pilot orifice size and ceramic ball, a fast response, and very high force margin.

In one embodiment a clapper style solenoid having a short first stage armature stroke is utilized. In such embodiment a very fast second stage movement results due to a high force margin and short stroke enabled thereby. Certain embodiments provide a high flow output and are flexible for a variety of second stage valves for high and low flow requirements.

In an embodiment of the present invention, the solenoid actuator has low leakage in view of the high sealing force on the second-stage piston. This enables the use of metallic seals, which provides high durability. The low leakage is also a result of the first stage ceramic ball utilized in one embodiment that has very tight, ball bearing tolerances. This ensures a very low leakage ball-to-metal seat when the first stage is closed.

In certain embodiments the cold gas thruster of the present invention utilizes a non-welded, threaded design. Such threaded interfaces for the first stage actuator and the nozzle eliminate welds and the cost of qualification and inspection. Further, in such embodiments the threaded interfaces allow for disassembly and troubleshooting during final assemble and test, thereby further reducing costs.

In an embodiment, the threaded and bolted first stage design allows for the first stage solenoid to be easily adapted to other solenoid applications. This threaded design allows for different lengths of 2nd stage poppets, thus enabling a variety of strokes to meet required flow rates or thrust classes for different applications.

In certain embodiments, a removeable/replaceable supersonic nozzle is provided. This allows for a variety of nozzle sizes for different thrust outputs and ideal expansion configurations using the same actuator and overall thruster design. It also allows for different style of nozzle diffuser sections (e.g., conical, bell, etc.) using the same design.

In an embodiment of the present invention, the first stage actuator utilizes a guided clapper style armature. This provides a high force margin electric solenoid with improved high vibration performance. In such an embodiment, the armature return spring seat/stop cup has an overall height that sets the closed armature air gap. A simple disk design for return pole allows for matching the air gap created by the armature return spring seat/stop cup upon final assembly by making this part a select pack (i.e., different thicknesses). In an embodiment, a simple, bobbin wound coil is installed into the solenoid housing.

In certain embodiments, an integrated inlet fitting is provided in or defined by the main housing. Such an embodiment reduces part count and improves reliability. This also improves high pressure structural performance by eliminating a separate fitting interface.

Through a combination of one or more of the above features, embodiments of the present invention provide a two-stage cold gas thruster that turns on and off with fast response times, and that can utilize high-pressure nitrogen that is expanded through a supersonic nozzle to create thrust. Such embodiments require only low power for actuation but provide fast response, have low mass and envelope size, high flow output, low internal leakage, and the ability to create multiple thrust outputs by changing the nozzle only, without changing the solenoid actuator. Certain embodiments are suitable for existing and future space application, e.g., in missiles, rockets, satellites, etc. Changing between a variety of thrust outputs require only changing only one part, to wit, the nozzle. Such a platform approach and reuse provide for lower production costs.

In a preferred embodiment of the present invention, a cold gas thruster includes a housing having an integrated inlet, a nozzle coupling, and an actuator coupling formed thereby. The thruster also includes a nozzle body that is removably coupled to the housing at the nozzle coupling, and an actuator removably coupled to the housing at the actuator coupling. The actuator has a first stage solenoid configured to position a check ball on a bleed orifice of a piston guide, and a second stage piston slidably received in the nozzle to open and close a thrust orifice in the nozzle between the inlet and a thrust outlet. The piston includes an orifice configured to couple pressurized gas from the inlet to a back side of the piston between the piston and the piston guide to hold the piston closed against the thrust orifice when the check ball is held by an armature of the first stage solenoid against the bleed orifice. Further, energization of the first stage solenoid moves the armature to allow the check ball to move off of the bleed orifice to bleed off the pressurized gas holding the piston closed to thereby allow the piston to open and allow the pressurized gas to flow to the thrust outlet.

In another embodiment, when the first stage solenoid is de-energized it causes the armature to position the check ball against the bleed orifice to block the escape of pressure on the back side of the piston, such that the piston is moved to close the thrust orifice. Preferably, the housing defines a vent passage that is configured to vent the pressurized gas from the back side of the piston when the check ball is off of the bleed orifice in a direction normal to the longitudinal axis of the nozzle. In one embodiment the vent passage includes a number of vent passages distributed equally around a periphery of the housing.

In an embodiment, the first stage solenoid is a clapper-style solenoid that preferably includes an armature spring configured to force the armature to seat the check ball against the bleed orifice. This is positioned in a ball guide between the piston guide the armature in an embodiment. Further, in an embodiment the armature is guided in an alignment bushing to seat the check ball against the bleed orifice. In a yet further embodiment, the sealing end of the second stage piston is formed as a round contoured surface to mate with a conical seat in the nozzle to form a cone-on-sphere arrangement with the "sphere" or round machined onto the piston that is slidably received in the nozzle to form a low leakage, metal to metal seal between the inlet and a thrust outlet.

In an embodiment of the present invention, a two-stage actuator for a cold gas thruster having a housing with an integrated inlet, a nozzle coupling, and an actuator coupling formed thereby, and a nozzle body removably coupled to the housing at the nozzle coupling. The two-stage actuator includes a solenoid housing configured to be removably coupled to the housing at the actuator coupling thereof, a first stage solenoid configured to position a check ball on a bleed orifice of a piston guide, and a second stage piston slidably received in the nozzle to open and close a thrust orifice in the nozzle between the inlet and a thrust outlet. Preferably, the piston includes an orifice configured to couple pressurized gas from the inlet to a back side of the piston between the piston and the piston guide to hold the piston closed against the thrust orifice when the check ball is held by an armature of the first stage solenoid against the bleed orifice. Further, energization of the first stage solenoid moves the armature to allow the check ball to move off of the bleed orifice to bleed off the pressurized gas holding the piston closed to thereby allow the piston to open and allow the pressurized gas to flow to the thrust outlet.

In a preferred embodiment, de-energization of the first stage solenoid causes the armature to position the check ball against the bleed orifice to block the escape of pressure on the back side of the piston, such that the piston is moved to close the thrust orifice. Preferably, the first stage solenoid is a clapper-style solenoid and includes an armature spring configured to force the armature to seat the check ball against the bleed orifice.

In a further embodiment, the check ball is positioned in a ball guide between the piston guide the armature. The armature is guided in an alignment bushing to seat the check ball against the bleed orifice. Preferably, a sealing end of the second stage piston is formed as a round contoured surface to mate with a conical seat in the nozzle to form a cone-on-sphere arrangement with the "sphere" or round machined onto the piston slidably received in the nozzle to form a low leakage, metal to metal seal between the inlet and a thrust outlet that can handle a small degree of piston mis-alignment and/or tilt to maintain sealability.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

Figure 1:
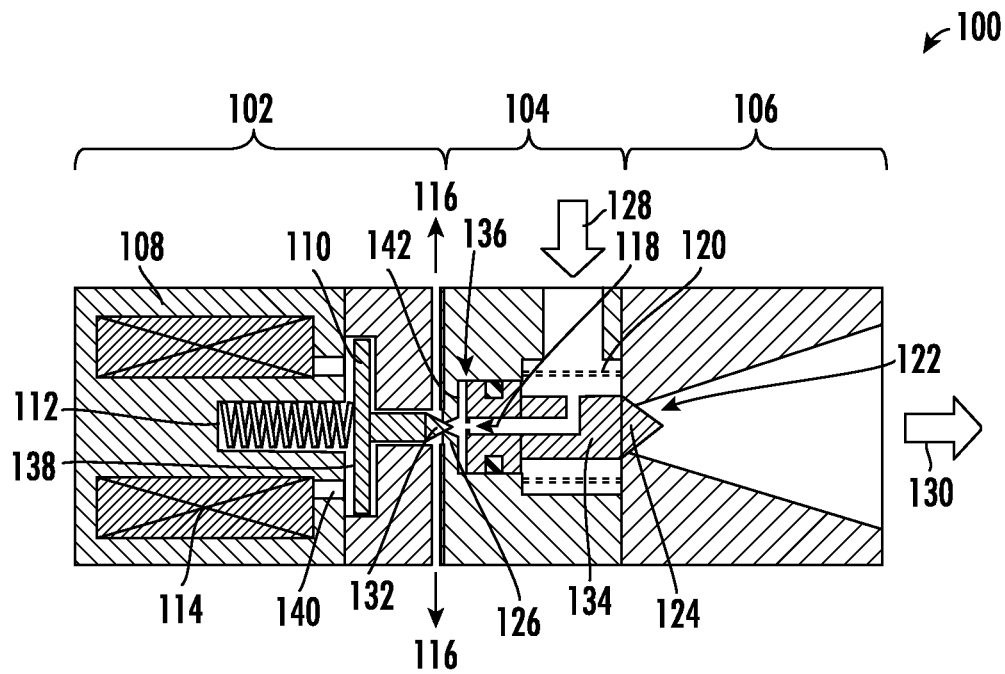
FIG. 1 is a cross-section illustration of an embodiment of a two-stage cold gas thruster constructed in accordance with the teachings of the present invention.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning now to the drawings, there are illustrated embodiments of the present invention that may provide cold gas thrust for numerous air and space applications. However, while the illustrated embodiments are suitable for such applications, other embodiments of the present invention are not so limited, and such description should be taken by way of example and not by way of limitation. Indeed, the two-stage solenoid actuator utilized in embodiments of the present invention may also find use in other applications that require low power, fast actuation and termination, and other benefits described herein.

With reference to FIGS. 1-4, there are illustrated cross-sections of embodiments of a two-stage cold gas thruster 100, 100', 200, 200', respectively, constructed in accordance with the present invention. In each such embodiments, pressurized gas (e.g., nitrogen) comes into the inlet 128, 228 of the second stage valve 104, 204, through the filter 120, 220 surrounding the piston 134, 234 or through the filter 120', 220' positioned in the inlet 128, surrounds the piston 134, 234 outer diameter (OD), and fills the cavity 136, 236 on the back side of the piston 134, 234 through the control orifice 118, 218 therethrough. With the electrical solenoid coil 114, 214 of the first stage solenoid valve 102, 202 de-energized, the resulting force imbalance pushes the piston 134, 234 into the second stage valve seat 124, 224, creating a low leakage, metal to metal seal between the inlet 128, 228 and outlet 130, 230.

Figure 2:
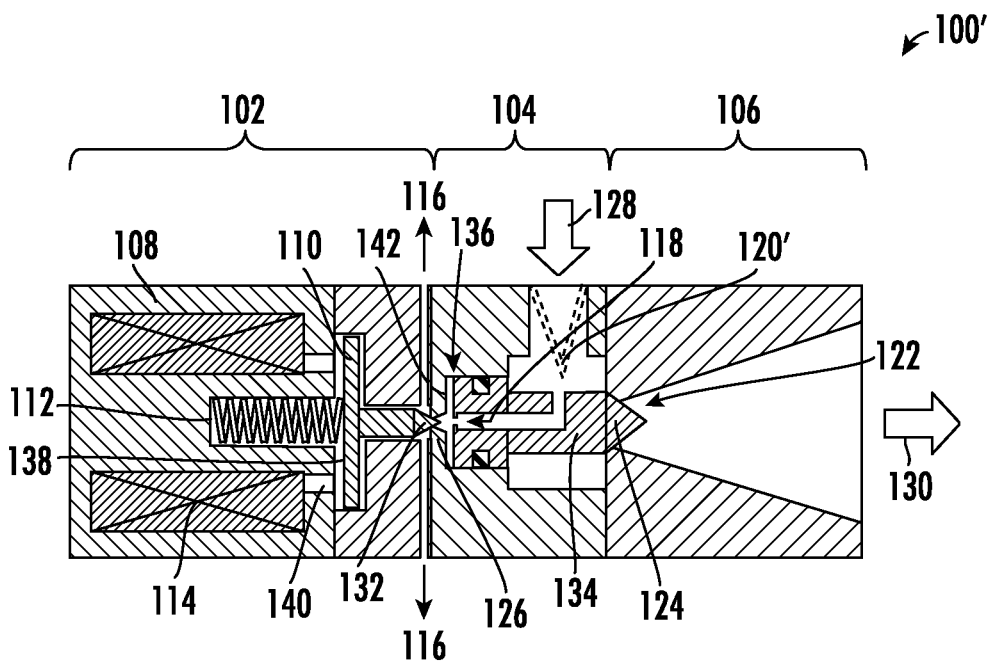
FIG. 2 is a cross-section illustration of the embodiment of a two-stage cold gas thruster of FIG. 1 utilizing an alternative filter placement constructed in accordance with the teachings of the present invention.

While the embodiments of FIGS. 1 and 2 utilize a poppet-style piston 134 and second stage valve seat 124, the piston 234 and second stage valve seat 224 of the embodiment of FIG. 2 are configured as a "cone-on-sphere" arrangement with the "sphere" or round machined onto the piston 234. This seat arrangement has proven to be an excellent, low leakage, metal to metal seal.

The pressure on the back side of the piston 134, 234 is held in the cavity 136, 236 by the armature 110, 210 of the first stage solenoid valve 102, 202 that pushes the valving member against the first stage valve seat. While the embodiment of FIG. 1 utilizes a poppet-style valving member 132 to seal against the first stage valve seat 126, the embodiment of FIG. 2 utilizes a check ball 232 that is pushed against the first stage valve seat 226. In each embodiment, the force closing the first stage solenoid valve 102, 202 is provided by the armature spring 112, 212.

When the solenoid coil 114, 214 is energized, the armature 110, 210 moves toward the solenoid assembly 108, 208, against the armature spring 112, 212, until the armature stop 138, 238 hits the solenoid housing pole 140, 240. The armature stop 138, 238 sets the closed air gap. The armature 110, 210 movement allows the valving member 132 of FIG. 1 or the check ball 232 of FIG. 2 to move away from the first stage valve seat 126, 226 in order to bleed off the pressure on the backside 136, 236 of the piston 134, 234 of the second stage valve 104, 204. This changes the direction of the force imbalance on the piston 134, 234 such that it moves away from the second stage valve seat 124, 234 and stops against the piston guide 142, 242.

In this state, flow from the inlet 128, 228 through the control orifice 118, 218 remains continuous, with the sizing of the control orifice 118, 218 setting the maximum vent flow rate. This vent flow is then release to the ambient via a plurality of first stage vent orifices 116, 216. In an embodiment, there are provided three vent orifices 116, 216 located radially around the main housing, pointed perpendicular relative to the centerline of the thruster 100, 100', 200, 200' and having a circumferential spacing of 120° in order to provide a net neutral vent thrust. More or fewer vent orifices 116, 216 may be provided and spaced accordingly so as to also provide this neutral vent thrust. Flow from the inlet 128, 228 can then go through the supersonic nozzle throat 122, 222 and exit out the outlet 130, 230 creating thrust along the centerline of the nozzle 106, 206.

Figure 3:
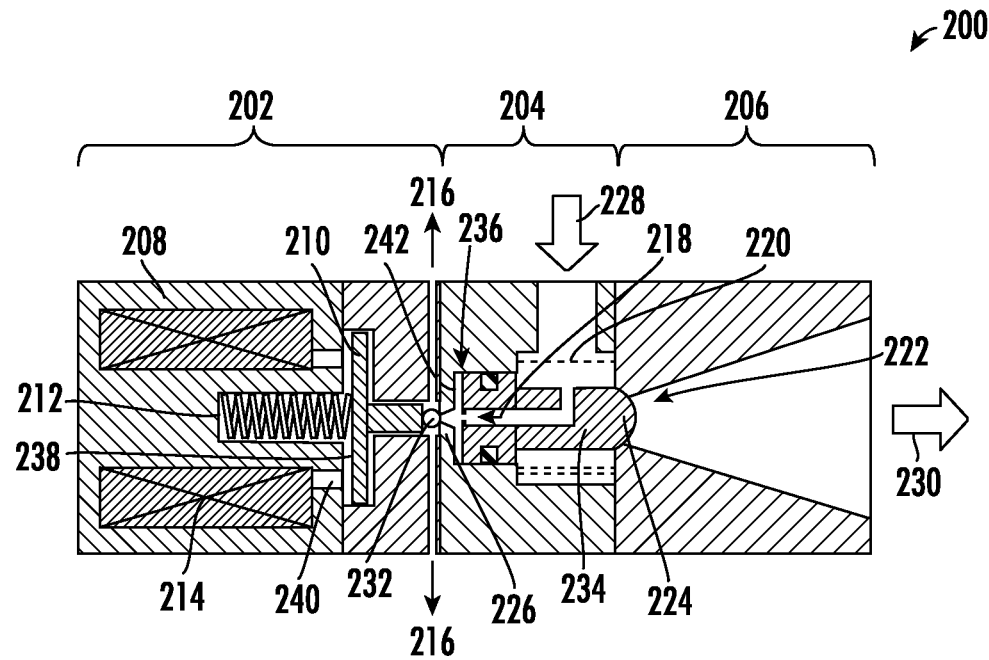
FIG. 3 is a cross-section illustration of an alternate embodiment of a two-stage cold gas thruster constructed in accordance with the teachings of the present invention.
Figure 4:
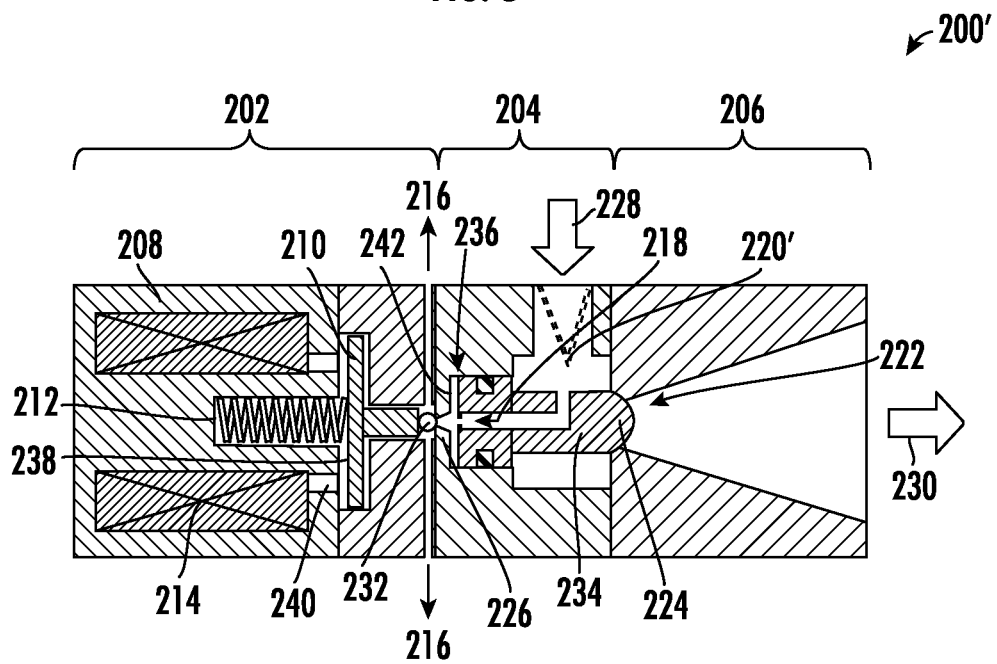
FIG. 4 is a cross-section illustration of the embodiment of a two-stage cold gas thruster of FIG. 3 utilizing an alternative filter placement constructed in accordance with the teachings of the present invention.

When the solenoid coil 114, 214 is de-energized, the valving member 132 of FIGS. 1 and 2 or the check ball 232 of FIGS. 2 and 3 is forced against the first stage valve seat 126, 226 via the armature 110, 210 being pushed by the armature spring 112, 212. This blocks the escape of pressure on the back side 236 of the piston 134, 234 of the second stage valve 104, 204, so that it can re-pressurize back to inlet pressure. This creates the force imbalance required to move the piston 134, 234 towards and contact against the seat 124, 224, thus closing the second stage valve 104, 204.

The two-stage actuation allows for the use of a smaller, lighter weight, and faster electro-magnetic solenoid 108, 208 to open and close the main (second stage 104, 204) piston 134, 234 regardless of the thrust requirements of the thruster 100, 100', 200, 200'. Both the poppet-style 124 and the cone-on-sphere 224 piston/seat interface are very durable and have excellent sealing, and the design of the two-stage thruster 100, 100', 200, 200' actuator ensures that the seal is held at an appropriate force by the pressurized gas of the thruster. Indeed, because the illustrated embodiments utilize a thread-on nozzle 106, 206, it allows for a variety of nozzle designs and thrust outputs by changing only one part, to with the nozzle 106, 206.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context. For example, combinations of the different valving elements for the first and second stage valves are contemplated, including using a check ball to close against the first stage valve seat with a poppet-style valving member to close against the second stage valve seat, and using a valving member to close against the first stage valve seat with a cone-on-sphere configuration for the second stage valve, etc.

What is claimed is:

1. A cold gas thruster, comprising:
a housing having an integrated inlet, a nozzle coupling, and an actuator coupling formed thereby;
a nozzle body removably coupled to the housing at the nozzle coupling; and
an actuator removably coupled to the housing at the actuator coupling thereof, the actuator having a first stage solenoid configured to open and close a bleed orifice of a piston guide, and a second stage piston slidably received in a nozzle to open and close a thrust orifice in the nozzle between the integrated inlet and a thrust outlet;
wherein the second stage piston includes an orifice configured to couple pressurized gas from the integrated inlet to a back side of the second stage piston between the second stage piston and the piston guide to hold the second stage piston closed against the thrust orifice when the bleed orifice is closed by an armature of the first stage solenoid; and
wherein energization of the first stage solenoid moves the armature away from the bleed orifice to thereby allow the second stage piston to open to bleed off the pressurized gas holding the second stage piston closed and to allow the pressurized gas to flow to the thrust outlet.

2. The cold gas thruster of claim 1, wherein de-energization of the first stage solenoid causes the armature to close the bleed orifice to block the escape of pressure on the back side of the second stage piston, such that the second stage piston is moved to close the thrust orifice.

3. The cold gas thruster of claim 1, wherein the housing defines a vent passage therein configured to vent the pressurized gas from the back side of the second stage piston when the bleed orifice is opened in a direction normal to the longitudinal axis of the nozzle.

4. The cold gas thruster of claim 3, wherein the vent passage comprises a plurality of vent passages distributed equally around a periphery of the housing.

5. The cold gas thruster of claim 1, wherein the first stage solenoid is a clapper-style solenoid.

6. The cold gas thruster of claim 5, wherein the first stage solenoid includes an armature spring configured to force the armature to close the bleed orifice.

7. The cold gas thruster of claim 1, wherein the armature positions a check ball against a first stage valve seat to close the bleed orifice when a solenoid coil is de-energized.

8. The cold gas thruster of claim 7, wherein movement of the armature away from the bleed orifice when the solenoid coil is energized allows the check ball to come off of the first stage valve seat to open the bleed orifice.

9. The cold gas thruster of claim 1, wherein a sealing end of the second stage piston is formed as a round contoured surface to mate with a conical seat in the nozzle such that the round contoured surface of the second stage piston is slidably received in the nozzle to form a metal to metal seal between the integrated inlet and a thrust outlet.

10. The cold gas thruster of claim 1, further comprising a filter surrounding the second stage piston.

11. The cold gas thruster of claim 1, further comprising a filter positioned within the integrated inlet.

12. A two-stage actuator for a cold gas thruster having a housing with an integrated inlet, a nozzle coupling, and an actuator coupling formed thereby, and a nozzle body removably coupled to the housing at the nozzle coupling, the two-stage actuator comprising:
a solenoid housing configured to be removably coupled to the housing at the actuator coupling thereof;
a first stage solenoid configured to position a check ball on a bleed orifice of a piston guide; and
a second stage piston slidably received in a nozzle to open and close a thrust orifice in the nozzle between the integrated inlet and a thrust outlet;
wherein the second stage piston includes an orifice configured to couple pressurized gas from the integrated inlet to a back side of the second stage piston between the second stage piston and the piston guide to hold the second stage piston closed against the thrust orifice when the check ball is held by an armature of the first stage solenoid against the bleed orifice; and
wherein energization of the first stage solenoid moves the armature to allow the check ball to move off of the bleed orifice to bleed off the pressurized gas holding the second stage piston closed to thereby allow the second stage piston to open and allow the pressurized gas to flow to the thrust outlet.

13. The two-stage actuator for a cold gas thruster of claim 12, wherein de-energization of the first stage solenoid causes the armature to position the check ball against the bleed orifice to block the escape of pressure on the back side of the second stage piston, such that the second stage piston is moved to close the thrust orifice.

14. The two-stage actuator for a cold gas thruster of claim 12, wherein the first stage solenoid is a clapper-style solenoid.

15. The two-stage actuator for a cold gas thruster of claim 14, wherein the first stage solenoid includes an armature spring configured to force the armature to seat the check ball against the bleed orifice.

16. The two-stage actuator for a cold gas thruster of claim 12, wherein the check ball is positioned in a ball guide between the piston guide the armature.

17. The two-stage actuator for a cold gas thruster of claim 12, wherein the armature is guided in an alignment bushing to seat the check ball against the bleed orifice.

18. The two-stage actuator for a cold gas thruster of claim 12, wherein a sealing end of the second stage piston is formed as a round contoured surface to mate with a conical seat in the nozzle such that the round contoured surface of the second stage piston is slidably received in the nozzle to form a metal to metal seal between the integrated inlet and a thrust outlet.

19. The cold gas thruster of claim 12, further comprising a filter surrounding the second stage piston.

20. The cold gas thruster of claim 12, further comprising a filter positioned within the integrated inlet.

* * * * *